US012460277B2

(12) United States Patent
Valerio

(10) Patent No.: US 12,460,277 B2

(45) Date of Patent: Nov. 4, 2025

(54) METHOD, PROCESS, AND SYSTEM OF USING A MILL TO SEPARATE METALS FROM FIBROUS FEEDSTOCK

(71) Applicant: Thomas A. Valerio, Atlanta, GA (US)

(72) Inventor: Thomas A. Valerio, Atlanta, GA (US)

(*) Notice: Subject to any disclaimer, the term of this patent is extended or adjusted under 35 U.S.C. 154(b) by 992 days.

(21) Appl. No.: 17/255,899

(22) PCT Filed: Jun. 25, 2019

(86) PCT No.: PCT/US2019/039083

§ 371 (c)(1),
(2) Date: Dec. 23, 2020

(87) PCT Pub. No.: WO2020/006007

PCT Pub. Date: Jan. 2, 2020

(65) Prior Publication Data

US 2021/0277498 A1 Sep. 9, 2021

Related U.S. Application Data

(60) Provisional application No. 62/689,821, filed on Jun. 25, 2018.

(51) Int. Cl.

*B07B 4/00* (2006.01)
*B02C 23/10* (2006.01)
(Continued)

(52) U.S. Cl.

CPC .............. *C22B 7/005* (2013.01); *B02C 23/10* (2013.01); *B03B 9/061* (2013.01); *B03C 1/24* (2013.01); *B07B 4/00* (2013.01); *B09B 3/35* (2022.01); *B29B 17/02* (2013.01); *B03B 2009/068* (2013.01); *B03C 2201/20* (2013.01); *B29B 2017/0224* (2013.01); *B29B 2017/0268* (2013.01)

(58) Field of Classification Search

CPC ......... C22B 7/005; B02C 23/10; B03B 9/061; B03B 2009/068; B03C 1/24; B03C 2201/20; B07B 4/00; B07B 13/00; B07B 2230/01; B09B 3/00; B29B 17/02; B29B 2017/0224; B29B 2017/0268; Y02P 10/20

USPC .......................................................... 209/3.1

See application file for complete search history.

(56) References Cited

U.S. PATENT DOCUMENTS 3,905,556 A * 9/1975 Drage .................... B02C 23/14
241/DIG. 38

4,387,019 A * 6/1983 Dale ...................... B03B 9/061
209/19

(Continued)

FOREIGN PATENT DOCUMENTS

CN 105234160 A * 1/2016
CN 106734081 A * 5/2017

(Continued)

*Primary Examiner* — Gene O Crawford
*Assistant Examiner* — Muhammad Awais
(74) *Attorney, Agent, or Firm* — Nigamnarayan Acharya

(57) ABSTRACT

A method for recovering metals from waste in which material is roughly or coarsely separated to leave a fibrous feedstock, the feedstock is comminuted with a mill (e.g., a ball mill) to liberate and separate the fibrous feedstock to obtain a mix of a metal fraction and residue, and the metals fraction and the residue are collected. There is a system employing the same to treat such materials.

19 Claims, 2 Drawing Sheets

200
265
250
235
210
230
260
240
270
267

(51) Int. Cl.

| | |
|---|---|
| ***B03B 9/06*** | (2006.01) |
| ***B03C 1/24*** | (2006.01) |
| ***B09B 3/35*** | (2022.01) |
| ***B29B 17/02*** | (2006.01) |
| ***C22B 7/00*** | (2006.01) |

(56) References Cited

U.S. PATENT DOCUMENTS 5,205,019 A * 4/1993 Schnlichter ............ D01B 3/025 209/552
5,312,052 A * 5/1994 Dellekamp ............... B02C 4/02 241/24.19
5,335,786 A * 8/1994 Roberto .................. B29B 13/10 209/636
5,443,157 A * 8/1995 Baker ..................... B03B 9/061 241/DIG. 38
5,465,847 A * 11/1995 Gilmore .................. B07B 13/00 209/31
5,524,838 A * 6/1996 Ellers ...................... B02C 18/14 241/DIG. 31
6,685,116 B1 * 2/2004 Hisazumi ................ B03B 9/061 241/19
6,883,667 B1 * 4/2005 Lindsey .................. B07B 11/04 209/132
8,138,437 B2 * 3/2012 Valerio ................... C22B 7/005 324/207.16
8,201,692 B2 * 6/2012 Valerio ..................... B09B 3/00 209/552
8,322,639 B2 * 12/2012 Gitschel .................... B03C 1/30 241/24.22
8,360,347 B2 * 1/2013 Valerio ................... C22B 7/005 209/133
9,566,587 B2 * 2/2017 Warkentin ............... B03D 1/00
2003/0213859 A1 * 11/2003 Simon ..................... B03B 9/061 241/19
2007/0180955 A1 * 8/2007 Warner ................... C21C 5/562 75/406
2008/0105771 A1 * 5/2008 Simon ....................... C10L 5/46 241/24.12
2008/0257794 A1 * 10/2008 Valerio ................... B03B 9/061 209/567
2011/0017644 A1 * 1/2011 Valerio ................... B07C 5/344 209/44.1
2011/0147501 A1 * 6/2011 Valerio ................... C22B 7/005 209/133
2012/0032008 A1 * 2/2012 Andersen ................ B03B 9/061 241/24.13
2012/0190102 A1 * 7/2012 Gitschel .................. B02C 19/00 435/267
2012/0199676 A1 * 8/2012 Valerio ............... C22B 15/0056 241/20
2013/0174694 A1 * 7/2013 Xu .......................... F27D 11/12 75/10.13
2015/0136663 A1 * 5/2015 Valerio ..................... B07B 9/02 209/44
2017/0209870 A1 * 7/2017 Valerio ................... B03B 5/623
2017/0253891 A1 * 9/2017 Gitschel .................... B03B 9/06
2018/0111131 A1 * 4/2018 Filmer ..................... B03D 1/10

FOREIGN PATENT DOCUMENTS

DE 19726105 A1 * 12/1998 ............. B03B 9/061
FR 2962924 A1 * 1/2012 ............. B03B 9/061
GB 2428986 A * 2/2007 ............. B02C 23/08
JP 2016089196 A * 5/2016
WO WO-2011053913 A1 * 5/2011 ............. B03B 9/061
WO WO-2018102472 A1 * 6/2018 ............. B02C 17/00
WO WO-2018198042 A1 * 11/2018 ............. B02C 13/00

* cited by examiner

METHOD, PROCESS, AND SYSTEM OF USING A MILL TO SEPARATE METALS FROM FIBROUS FEEDSTOCK

CROSS-REFERENCE TO RELATED APPLICATIONS

This application claims the benefit of priority to U.S. Provisional Patent Application No. 62/689,821, filed Jun. 25, 2018, the contents of these applications are hereby incorporated by reference in their entirety.

TECHNICAL FIELD

This application relates to systems and methods for recovering metals from fibrous material in a wet or dry process. This application also relates to methods and systems herein relate to the recovery of metals from a waste stream originating from light fractions containing embedded/entangled metals with fibrous materials from various course processes.

BACKGROUND

More than 50 million vehicles each year reach the end of their service life throughout the world. More than 95% of these vehicles enter a comprehensive recycling infrastructure that includes auto parts recyclers/dismantlers, remanufacturers, and material shredders. About 65% of automotive materials are profitably recycled ultimately by the scrap processing (shredding) industry. The process by which the scrap processors recover metal scrap from automobiles involves shredding the automobiles and the associated metal-containing products (such as white goods, industrial scrap, and demolition debris), and recovering the metals from the shredded material. For example, the shredder can be a hammer mill that shreds vehicles and other metal-containing scrap into mostly fist-size chunks to liberate the metals. The majority of metals are recovered from the shredded material, which leaves a non-metallic fraction (having limited metals) or shredder residue.

The non-metallic fraction that remains after the metals are recovered from the shredded materials (about 25% of the weight of the vehicle)—commonly called shredder residue can have metals and valuable materials. me of this fraction is deposited into a landfill or burned, as the material contains fibrous material, which makes further metal reclamation or recovery difficult. This is an example of fibrous feedstock and is difficult to recycle.

Accordingly, there is a need for an improved method for reclaiming metals and materials from fibrous feedstock. It is to this need, among, others that this application is directed.

SUMMARY

This application discloses methods and systems for recovering metals, e.g., copper and precious metals, through the use of comminution (e.g., a ball mill or rod mill). Specific embodiments may be carried out in wet processes or dry processes. That is, the wet process can include a slurry or dry mix of fibrous feedstock (e.g., a having fibrous organic material and metals). Specific embodiments include the processing of fibrous feedstock that can be aspirated lights (light material from an aspirator) and/or lights from a wet rougher or process, e.g., a heavy media plant, or rising current separation using water.

This application also discloses methods and systems for recovery of metals from a waste stream originating from light fractions containing embedded/entangled metals with fibrous materials from (a) streams from, e.g., preconcentrators, water table concentrators, gold shaking tables such as produced by diester concentrators, Wilfery table concentrators, sink float tanks, sink float vessels, snail drums, barrel washers, wet processes using heavy media, DMS separators, hydro cyclones, and other processes and (b) streams from dry processes e.g, roughers such as an air aspirator Z box aspirator (broadly used in the EU for pre-concentrating auto mobile shredder residue, the light fraction containing embedded/entangled metals with the fibrous materials, such as carpet, foam, fiber and or fabrics), dry destoners, friction separators, ballistic separators, air tables, cyclones, blowers, air knife separators or dry separation devices that separate lights from heavies and the lights contain fuzz and fibrous materials that have metal embedded within materials, also known as light fractions. Embodiments include systems and methods for recovering metals from fibrous material in a wet or dry process.

Another aspect of this application includes a method for recovering metals from metal-based waste including roughly or coarsely separating the metals from the waste to leave a fibrous feedstock, comminuting the fibrous feedstock with a mill (ball or rod) to liberate and separate the fibrous feedstock to obtain a mix of a metal fraction and residue, and collecting the metals fraction and collecting the residue. The comminution step can be after or downstream of the rough or course separation step.

Another aspect of this application is a system for recovering metals from fibrous waste having a source of fibrous feedstock having a metal content of <5% by weight, and a mill in fluid connection with the source, wherein the mill liberates and separate the fibrous feedstock to obtain a mix of a metal fraction and residue.

DETAILED DESCRIPTION

Figure 1:
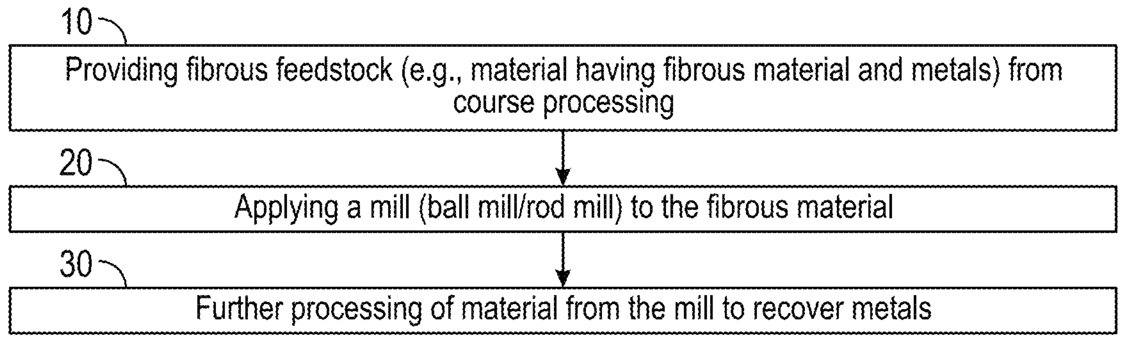
FIG. 1 illustrates an exemplary method employing comminution of fibrous feedstock.

Specific applications include methods and systems relate to the recovery of metals from any wet process or dry process. Such wet processes may include streams from, e.g, preconcentrators, water table concentrators, gold shaking tables such as produced by diester, Wilfery table concentrators, sink float tanks, sink float vessels, snail drums, barrel washers, wet processes using heavy media, DMS separators, hydro-cyclones, and other processes. Such dry processes, e.g., roughers such as an air aspirator Z box aspirator (broadly used in the EU for pre-concentrating auto mobile shredder residue, the light fraction containing embedded/ entangled metals with the fibrous materials, such as carpet, foam, fiber and or fabrics), dry destoners, friction separators, ballistic separators, air tables, cyclones, blowers, air knife separators or dry separation devices that separate lights from heavies and the lights contain fuzz and fibrous materials that have metal embedded within material, also known as light fractions. Other wet and dry processes are known to those with skill in the art.

This application includes methods and systems for recovering metals, e.g., copper and precious metals, through the use of comminution (e.g., a ball mill or rod mill). Specific embodiments may be carried out in wet processes or dry processes. That is, a wet process can include a slurry or dry mix of fibrous feedstock (e.g., a having fibrous organic and plastic material and metals). Specific embodiments include the processing of fibrous feedstock that is aspirated lights (light material from an aspirator) and/or lights from a wet rougher or process, e.g., a heavy media plant, or a rising current separation using water.

In one embodiment, the processes and systems were found to be highly effective in recovering metal from feedstock that was aspirated waste, which is common in the European Union from processes that do not involve incineration. Aspirators are well known in the classifying art and result in a light fraction having organic material with limited amounts of metal and such metal tends to be buried/embedded/entangled with the organic fibers. Often, the fibrous feedstock has buried, embedded, or entangled plastic therein. This type of waste is referred herein as aspirated fibrous feedstock.

One method for recovering metals from waste includes roughly or coarsely separating the metals from the waste to leave a fibrous feedstock, comminuting the fibrous feedstock with a mill to liberate and separate the fibrous feedstock to obtain a mix of a metal fraction and residue, and collecting the metals fraction and collecting the residue. The comminution step can be after or downstream of the rough or course separation step. In one example, the course processing does not include processing with a ball mill or rod mill. In many instances, the fibrous feedstock is a type where the additional metals cannot be economically reclaimed from the material and the material is usually discarded.

FIG. 1 shows the three main steps of one specific embodiment of this invention. The first step 10 is the introduction of materials having fibrous materials, which may be a product of course or rough processing. The second step 20 is to apply or comminute with a mill (e.g., a ball mill) to the material or fibrous feedstock, which effectively separates fibers or fuzz from or embedded in the metal. The comminution can be performed in a mill that uses media (e.g., a ball mill, a tumbling mill, a drum mill, or a rod mill). The next step 30 is to separate the comminuted or crushed material using techniques such as specific gravity separation, including centrifugal, inertial, and gravity classifications. In one embodiment, the material may be sorted or screened and then further processed to recover materials. In other embodiments, the feedstock material or the crushed material may be treated may have been treated with a wet magnet and screened accordingly. In some examples, the course processing may be aligned with the mill so that that course processing "feeds" the mill.

In one specific example, the fibrous feedstock is conveyed to a ball mill for comminution or crushing. After which, the material may be treated with a wet magnet to remove iron and then is screened or cut (e.g., between 0-4 mm). The material greater than the cut may be treated by fluidized separation or an inertia table and the material less than the cut may be treated using other techniques (e.g., hydrocyclones or spiral separators).

Figure 2:
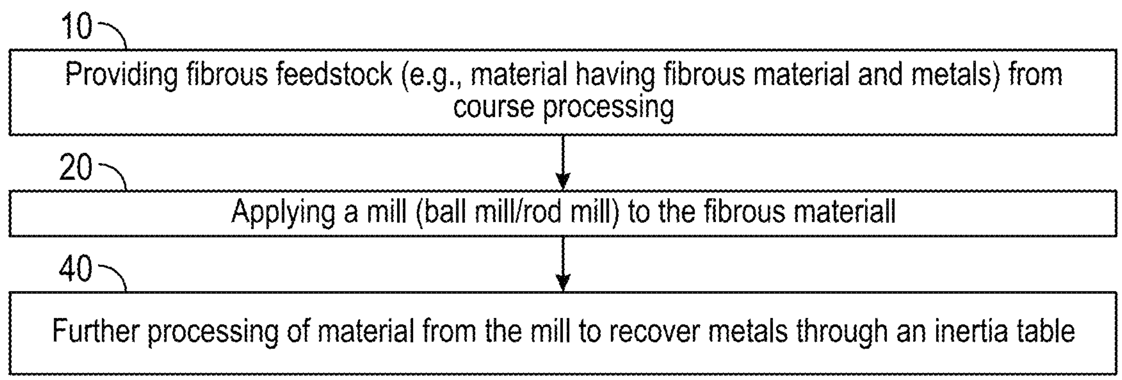
FIG. 2 illustrates another exemplary method employing comminution of fibrous feedstock together with an inertia table.

In another specific example, the material greater than the cut or from the mill may be treated by fluidized separation or an inertia table 40 shown in FIG. 2. The separation may include an inertia table that includes a frame, a tray or tilt tray, a cam, and a motor. The tray can be secured to (e.g., pneumatic) cylinders/springs/spring-type elements, which can be secured to the frame. Materials processed by the upstream delivery station are accumulated on or conveyed by a tray, which separates and moves material by creating a moment of inertia and/or rotary motion translated into reciprocating/oscillating motion (e.g., a stroke/follower motion). As a result, heavier materials are carried forward and the lighter materials are carried backwards. One exemplary inertia table is now available from TAV Holdings, Inc.

Another embodiment includes a method of recovering a metal product with a given particle size distribution. This method includes loading feedstock with fibrous organic material into a ball mill and operating the ball mill to mill the feedstock to separate or liberate the organic fibrous material from the metals. The ball milling was able to liberate, separate or remove the fibrous feedstock and was found to result in a higher metal recovery efficiency.

Figure 3:
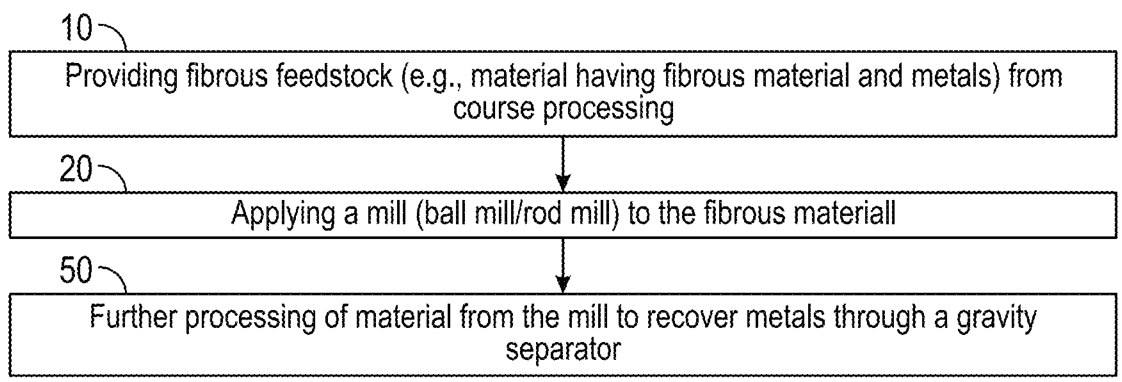
FIG. 3 illustrates another exemplary method employing comminution of fibrous feedstock together with a gravity separator.

In another embodiment shown in FIG. 3, the material processed by the ball mill or the rod mill is further processed using a gravity separator 50 (e.g., jigs, hydrocyclones, gravity sink/float tanks, and kinetic density separators). A gravity separator uses the differences in density for the separation of solid particles that have different densities from a generally homogeneous mixture of solids. Because residue is very heterogeneous and its contents have overlapping densities and shapes, gravity separation of shredder residue, as-is, cannot yield products from shredder residue, except for metals, as practiced in some wet shredder facilities. Such separators can be operated by using water or a heavy media.

In one example, the ball mill was operated as a wet ball mill. In some examples, the mill or ball mill can be a rod mill, a ball mill, and other equivalents that will occur to those of skill in the art. The mill may be rubber lined, which gave unexpectedly good results or resulted in substantial separation of the metals from the fibers. In at least some such examples, crushed material is moved by a conveyor and discharged into a unit where the materials are reduced in size or further processed.

In one embodiment, the ball mill application can be downstream from the shredding process, which operations may vary from site to site, but the basic process involves air classification of the"lights" fraction followed by one or more stages of magnetic separation to recover the ferrous metals. Trommels can be used to remove smaller particles, followed by one or more stages of eddy current separations to recover the nonferrous metals. Conveyors are used to move materials around. In one example, the rejects from the eddy currents can be combined with the "lights" fraction and conveyed to a ball mill. Aggregates and glass are pulverized into smaller fractions than aluminum, copper, and other metals and can be effectively screened.

The fibrous feedstock can be a material having fibrous organic or plastic material. Such material includes ASR material treated to recover light materials. In other examples, the material may be electronic waste. In one example, the fibrous feedstock can be municipal waste. In other examples, the fibrous feedstock can be the light materials from other processes and include materials mixed with organic fibers.

In other examples, the fibrous feedstock may be the drops from an eddy current, which include metals and fibrous organic or plastic material. In some examples, the fibrous feedstock had about 0% organic material. In other examples, the fibrous feedstock has greater than 50% organic or plastic material. In other examples, the fibrous feedstock has greater than 75% organic or plastic material. In yet other examples, the fibrous feedstock may be greater than 90% or 95% organic or plastic material. That amount of organic or plastic material in the fibrous feedstock may vary from about 0 to about 100%. Fibrous feedstock may have less than 10 or 6%, 5% or 4% or 3% or 2% or 1% of metals by weight or volume. In some examples, the fibrous feedstock contains greater than 95% plastics or organics.

In many examples, the fibrous feedstock includes metals such as aluminum, zinc, copper, tin, nickel, silver, gold, iron and alloys thereof such as gold bronze, an alloy of copper and zinc, alloys of tin with aluminum, gallium and/or indium, or stainless steel, an alloy composed mainly of iron. The recovered metals can be polished to increase purity, value, and marketability.

Figure 4:
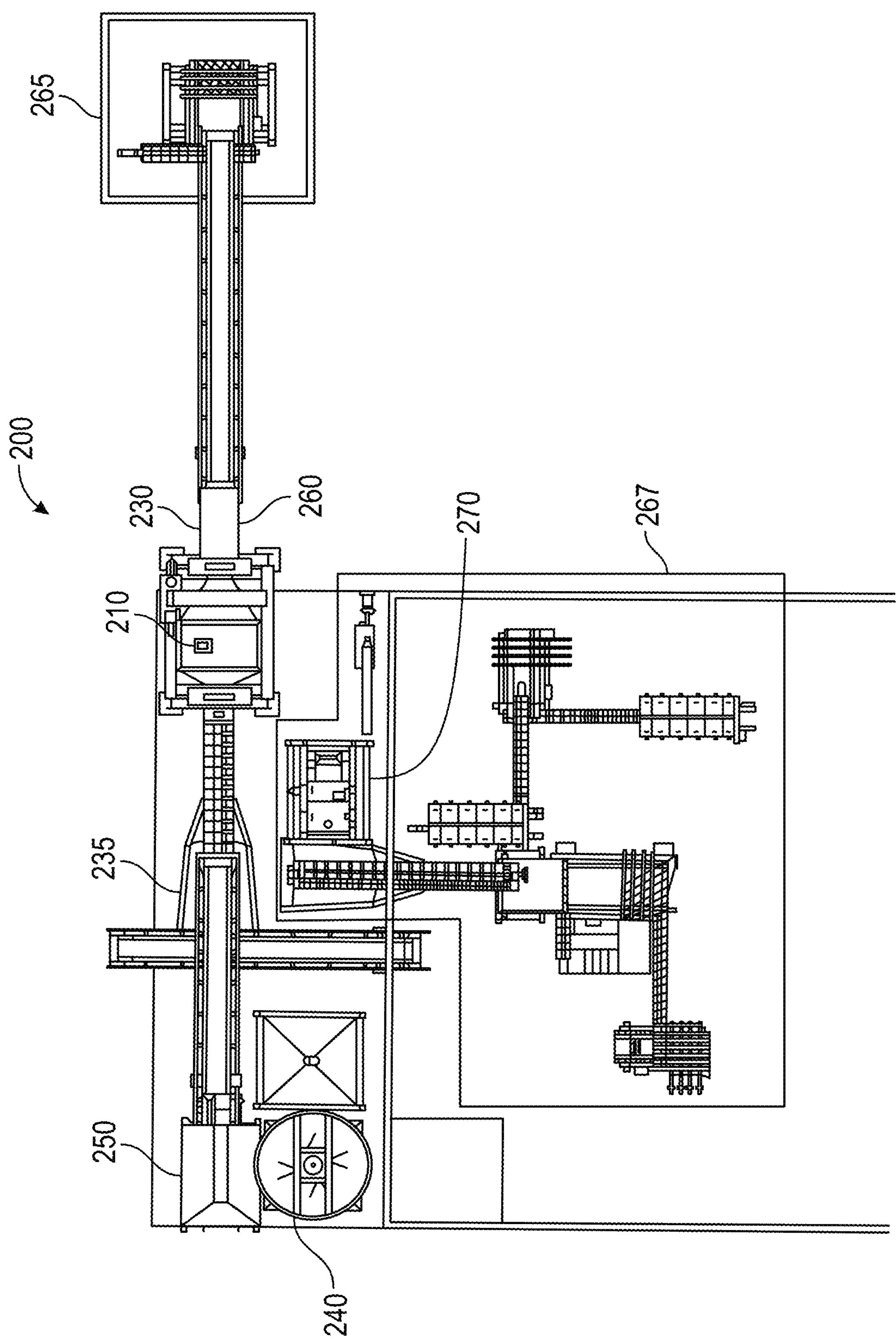
FIG. 4 illustrates an exemplary system employing a ball mill to liberate and separate metals from fibrous feedstock.

FIG. 4 shows one example of a system incorporating or executing methods described herein. The system 200 may have multiple tools, conveyors, and devices. For illustration only, the ball mill or mill 210 is downstream from the waste stream, i.e., the entering feedstock has a reduced metal content and fibers. In a basic embodiment, the fibrous feedstock 250 is conveyed to the ball mill 210 (e.g., wet or dry), and from the ball mill 210, the material can be divided, separated, and/or further processed. For example, the fibrous feedstock 250 can be conveyed to the ball mill 210 (e.g., wet or dry), and from the ball mill 210, the material can exit from an exemplary screen 230 (e.g., a nose cone), which can separate the material into smaller sized material and larger sized material (e.g., at a size between 10 mm and 25 mm). In one example, the material may be damped with water inlets 235 and include a water clarifier 240.

The larger sized material can be processed separately from the smaller sized portion, that is, for example, the smaller sized portion may be processed through a fine circuit 267 and the larger sized materials may be processed through heavier equipment 265. Some or all of the components shown therein may be used to effect the object of metal separation. The system can have optional water clarification systems 240, e.g., when the feedstock is combined with water prior to the ball mill 210 application. As can be seen, the system can incorporate wet magnets, screen, conveyors, screws, and other elements to improve the separation process. The process cycles can be selected based on desires and space constrictions of the operator.

In the separation process in accordance with the present embodiment, copper (e.g., tubes and wires) are pulverized and flattened into denser structures, which then sink in water or media (e.g., heavy media), whereas the aluminum component is flattened, which increases floatation properties. The aluminum, glass and copper can be efficiently separated, e.g., by an ordinary screening operation. The aluminum, glass and copper can also be efficiently separated into their components, e.g., by specific gravity separation, such as centrifugal, inertial, and gravity classifications. Other separation processes are known in the art.

Although specific embodiments of the disclosure have been described above in detail, the description is merely for purposes of illustration. It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description.

The invention claimed is:

1. A method for recovering metals from a metal-based waste, comprising:

shredding the waste and introducing material having fibrous material that may be a product of course or rough processing, roughly or coarsely separating the metals from the waste to leave a fibrous feedstock to leave a fibrous feedstock having less than about 5% by weight metal and at least about 50% by weight fibrous or plastic content, the fibrous feedstock derived from one or more "lights" fractions generated by an air aspirator, a heavy media plant, a rising current separation, or a water table concentrator comminuting the fibrous feedstock with a ball or rod mill to liberate and separate the fibrous feedstock to obtain a mix of a metal fraction and residue, and collecting the metals fraction and collecting the residue, wherein the metals are substantially all removed from the waste prior to the comminution, wherein the metals are substantially all removed from the waste prior to the comminution such that the fibrous feedstock has a metal content of less than about 5% by weight.

2. The method of claim 1, wherein the metals are recovered roughly using an eddy current.

3. The method of claim 1, wherein the fibrous feedstock has buried, embedded, or entangled plastics therein.

4. The method of claim 1, further comprising sizing the waste to less than 25 mm.

5. The method of claim 1, wherein the waste is shredded to less than about 1 inch.

6. The method of claim 1, further granulating the residue to an average particle size of 5 mm to 25 mm.

7. The method of claim 1, screening the residue with a vibrating screen to remove fines.

8. The method of claim 1, further comprising using a gravity separator to separate the metal fraction from the residue.

9. A system for recovering metals from fibrous waste, comprising

A source of the pre-processed fibrous feedstock having a metal content of less than 5% by weight, wherein materials having fibrous material are introduced as fibrous feedstock which may be a product of course or rough processing, and A mill in fluid connection with the source, wherein the mill liberates and separate the fibrous feedstock to obtain a mix of a metal fraction and residue.

10. The system of claim 9, further comprising a gravity separator in fluid connection with the mill.

11. The system of claim 9, wherein the mill is a rod mill, ball mill, a tumbling mill or drum mill.

12. The system of claim 9, wherein the mill is downstream from the fibrous feedstock.

13. The system of claim 9, the mix is sized and separated.

14. The system of claim 9, wherein the fibrous feedstock has buried, embedded, or entangled plastics therein.

15. A method of recovering metals from a fibrous feedstock containing embedded or entangled metals, the method comprising: receiving the fibrous feedstock from a coarse or rough separating process, wherein the fibrous feedstock is derived from at least one of an aspirated lights process or a wet rougher process, and the fibrous feedstock comprises fibrous organic material and a residual metal content; comminuting the fibrous feedstock in a mill selected from the group consisting of a ball mill, a rod mill, a tumbling mill, or a drum mill, thereby liberating the embedded or entangled metals from the fibrous material to produce a comminuted mixture; and separating the comminuted mixture into a metals fraction and a fibrous residue fraction.

16. The method of claim 15, wherein the fibrous feedstock is introduced as either:

(a) a substantially dry mixture comprising fibrous organic material and metal, or (b) a slurry containing water or other liquid media, and wherein the comminuting step is performed under corresponding dry or wet milling conditions.

17. The method of claim 15, further comprising passing the comminuted mixture through an inertia table, wherein the inertia table separates heavier metal-containing particles from lighter fibrous particles based on differences in inertia and motion.

18. The method of claim 15, further comprising subjecting the comminuted mixture to a gravity separation device selected from the group consisting of jigs, hydrocyclones, sink-float separators, and kinetic density separators, thereby concentrating the liberated metals separately from the fibrous residue.

19. The method of claim 15, wherein the fibrous feedstock has a metal content of less than about 5% by weight and comprises at least about 50% organic or plastic material, and wherein the comminuting step is effective to liberate substantially all of the metal fraction for subsequent collection.

* * * * *